United States Patent [19]
Yokoyama et al.

[11] Patent Number: 5,806,191
[45] Date of Patent: *Sep. 15, 1998

[54] HEDGE TRIMMER

[75] Inventors: Yoshio Yokoyama; Koji Haneda, both of Anjo, Japan

[73] Assignee: Makita Corporation, Anjo, Japan

[ * ] Notice: The portion of the term of this patent subsequent to Jan. 20, 2015, has been disclaimed.

[21] Appl. No.: 828,668

[22] Filed: Mar. 31, 1997

Related U.S. Application Data

[62] Division of Ser. No. 375,675, Jan. 20, 1995, Pat. No. 5,653,030.

[30] Foreign Application Priority Data

Jan. 20, 1994 [JP] Japan .................................. 6-004665

[51] Int. Cl.⁶ .............................. B26B 15/00; B26B 19/02
[52] U.S. Cl. ................................................ 30/216; 30/196
[58] Field of Search ............................ 30/208, 216, 217, 30/218, 219, 220, 196, 382, 228

[56] References Cited

U.S. PATENT DOCUMENTS

| | | | |
|---|---|---|---|
| 4,335,514 | 6/1982 | Overy et al. ............................... | 30/382 |
| 4,378,637 | 4/1983 | Kieser et al. . | |
| 4,406,066 | 9/1983 | Itzrodt ...................................... | 30/382 |
| 4,432,139 | 2/1984 | Kohler et al. .......................... | 30/382 X |
| 4,573,556 | 3/1986 | Andreasson ............................ | 30/382 X |
| 4,782,593 | 11/1988 | Kieser et al. ............................. | 30/382 |
| 4,811,487 | 3/1989 | Takahashi et al. ........................ | 30/382 |
| 5,653,030 | 8/1997 | Yokoyama et al. ....................... | 30/216 |
| 5,697,258 | 12/1997 | Aiyama .................................. | 30/216 X |

FOREIGN PATENT DOCUMENTS

| | | |
|---|---|---|
| 0687410 | 12/1995 | European Pat. Off. . |
| 2558567 | 7/1985 | France . |
| 6805183 | 10/1968 | Germany . |
| 2651231 | 5/1978 | Germany . |
| 3128282 | 2/1983 | Germany . |
| 3007110 | 6/1984 | Germany . |
| 3343772 | 6/1985 | Germany ................................. 30/216 |
| 3816362 | 11/1989 | Germany . |
| 1120728 | 7/1968 | United Kingdom . |
| 1219045 | 1/1971 | United Kingdom . |
| 1221130 | 2/1971 | United Kingdom . |

*Primary Examiner*—Rinaldi I. Rada
*Assistant Examiner*—Boyer Ashley
*Attorney, Agent, or Firm*—Dennison, Meserole, Pollack & Scheiner

[57] ABSTRACT

A hedge trimmer includes a motor and a cutting mechanism driven by the motor. A clutch mechanism is interposed between the motor and the cutting mechanism. A first and a second handle are provided to be grasped with both hands of an operator. A clutch control mechanism is provided for connecting and disconnecting the clutch mechanism. The clutch control mechanism includes a first and a second switch lever which are associated with the first and second handles, respectively, and which are operable by the operator between a first and a second position, respectively. A pin is operably connected to the first and second switch levers and is movable between a connecting position for connecting the clutch mechanism and a disconnecting position for disconnecting the clutch mechanism. Biasing members serve to hold the pin at the disconnecting position when at least one of the first and second switch levers are at the first position. The biasing members permit movement of the pin from the disconnecting position to the connecting position when both the first and second switch levers are moved from the first position to the second position.

3 Claims, 4 Drawing Sheets

HEDGE TRIMMER

This is a divisional of application Ser. No. 08/375,675, filed Jan. 20, 1995, now U.S. Pat. No. 5,653,030.

BACKGROUND OF THE INVENTION

1. Field of the Invention

The present invention relates to a hedge trimmer used mainly for a gardening work such as trimming of hedges and pruning of roadside trees.

2. Description of the Prior Art

DE-PS 3007110 C2 (U.S. Pat. No. 4,378,637) and DE-GM 6805183 disclose a hedge trimmer including two switch levers. In this hedge trimmer, movement of cutters are started only when both the switch levers have been actuated. In other words, when an operator releases either one of the switch levers, the released switch lever is turned off to disconnect a clutch mechanism, so that the movement of the cutters is stopped. The switch levers are operably connected to the clutch mechanism mainly by means of link mechanisms.

The two switch levers are provided normally on grip handles which are suitably positioned at the hedge trimmer, so that the operator can stably hold the hedge trimmer. For this reason, the switch levers are normally remotely positioned from the clutch mechanism. Actuating forces from the switch levers must therefore be transmitted to the clutch mechanism through a long and complicated path by the link mechanisms. Additionally, since one link mechanism is required for each switch lever to independently actuate the clutch mechanism, the number of parts of the link mechanisms increases. Further, this may cause a problem such as an improper operation of the hedge trimmer.

SUMMARY OF THE INVENTION

It is, accordingly, an object of the present invention to provide a hedge trimmer which is simple in construction.

It is another object of the present invention to provide a hedge trimmer which can be reliably operated.

According to the present invention, there is provided a hedge trimmer comprising:

a motor;

a cutting mechanism driven by the motor;

a clutch mechanism interposed between the motor and the cutting mechanism;

a first ahd a second handle adapted to be grasped with both hands of an operator; and a clutch control mechanism for connecting and disconnecting the clutch mechanism;

the clutch control mechanism including:

a first and a second switch lever associated with the first and second handles, respectively, and operable by the operator between a first and a second position, respectively;

a pin operably connected to the first and second switch levers and movable between a connecting position for connecting the clutch mechanism and a disconnecting position for disconnecting the clutch mechanism; and biasing members for holding the pin at the disconnecting position when at least one of the first and second switch levers are at the first position, the biasing members permitting movement of the pin from the disconnecting position to the connecting position when both the first and second switch levers are moved from the first position to the second position.

The invention will become more apparent from the appended claims and the description as it proceeds in connection with the drawings.

DETAILED DESCRIPTION OF THE PREFERRED EMBODIMENTS

An embodiment of the present invention will now be explained with reference to the accompanying drawings.

Figure 1:
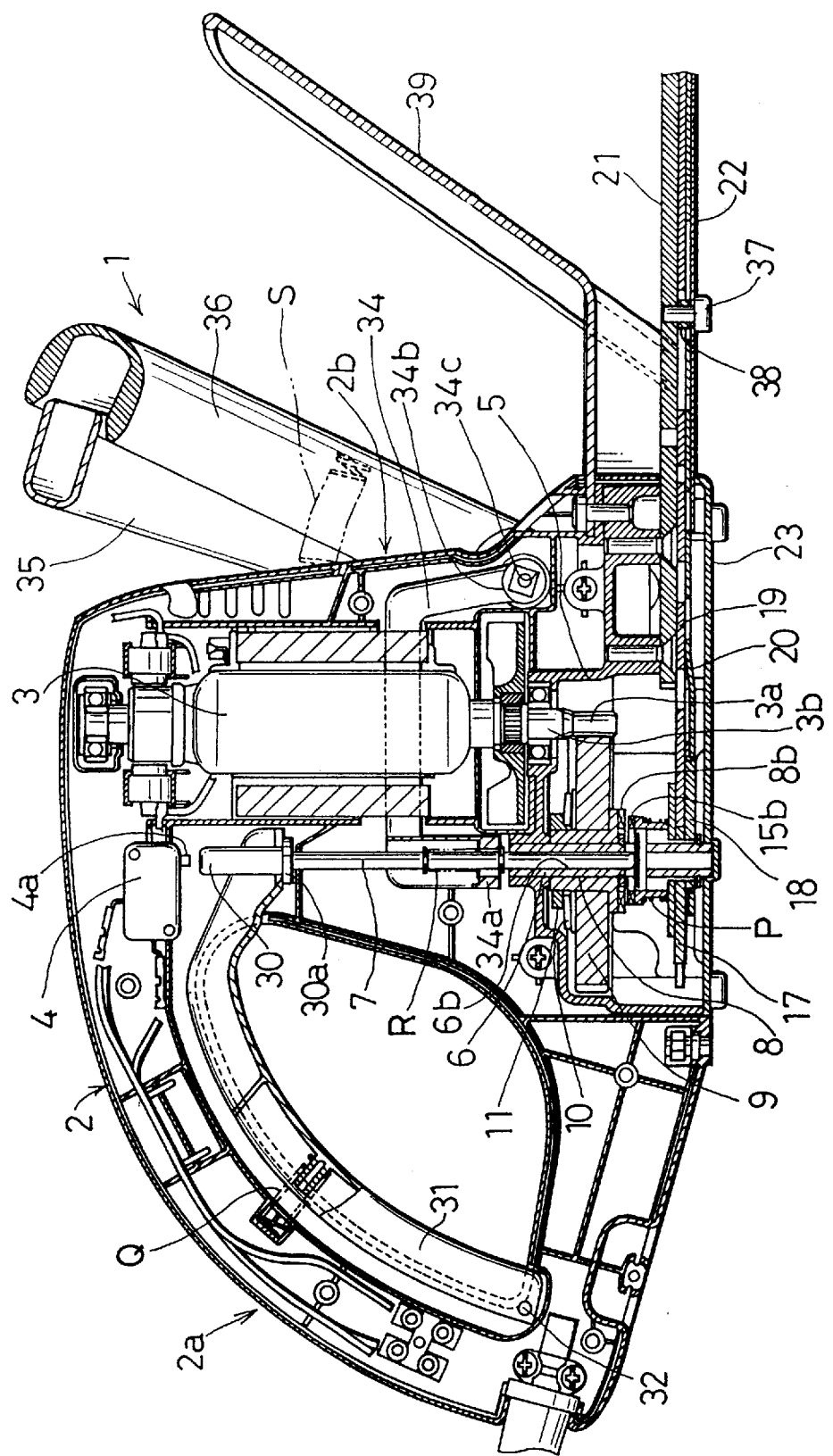
FIG. 1 is a vertical sectional view of a hedge trimmer according to an embodiment of the present invention.

Referring to FIG. 1, there is shown a hedge trimmer 1 having a housing 2. The housing 2 generally includes a main body 2b positioned on the right side in FIG. 1 and a substantially D-shaped handle 2a positioned on the left side in FIG. 2. The handle 2a is formed integrally with the main body 2b.

A motor 3 is accommodated within a central portion of the main body 2a. A switch 4 is disposed at a position adjacent a junction between the main body 2b and an upper portion of the handle 2a. The motor 3 is started and stopped when the switch 4 is turned on and off. The switch 4 includes a button 4a which is biased by a spring (not shown) to protrude normally downward from the switch 4. The switch 4 is turned on to start the motor 3 when the button 4a is pushed into the switch 4, while the switch 4 is turned off to stop the motor 3 when the button 4a is released to recover its protruded position.

A pinion gear 3a is formed on an output shaft 3b of the motor 3. The output shaft 3b protrudes downwardly into a gear housing 5 which is fitted on the main body 2b through a lower opening formed in the main body 2b. A support sleeve 6 is fixedly mounted within a left-side part of the gear housing 5 and extends in parallel to the output shaft 3b of the motor 3. A control pin 7 is inserted into an axial bore 6b of the support sleeve 6 and is slidably movable in an axial direction or vertical direction. The control pin 7 extends upwardly from the upper end of the support sleeve 6. The operation of the control pin 7 will be described later.

Figure 2:
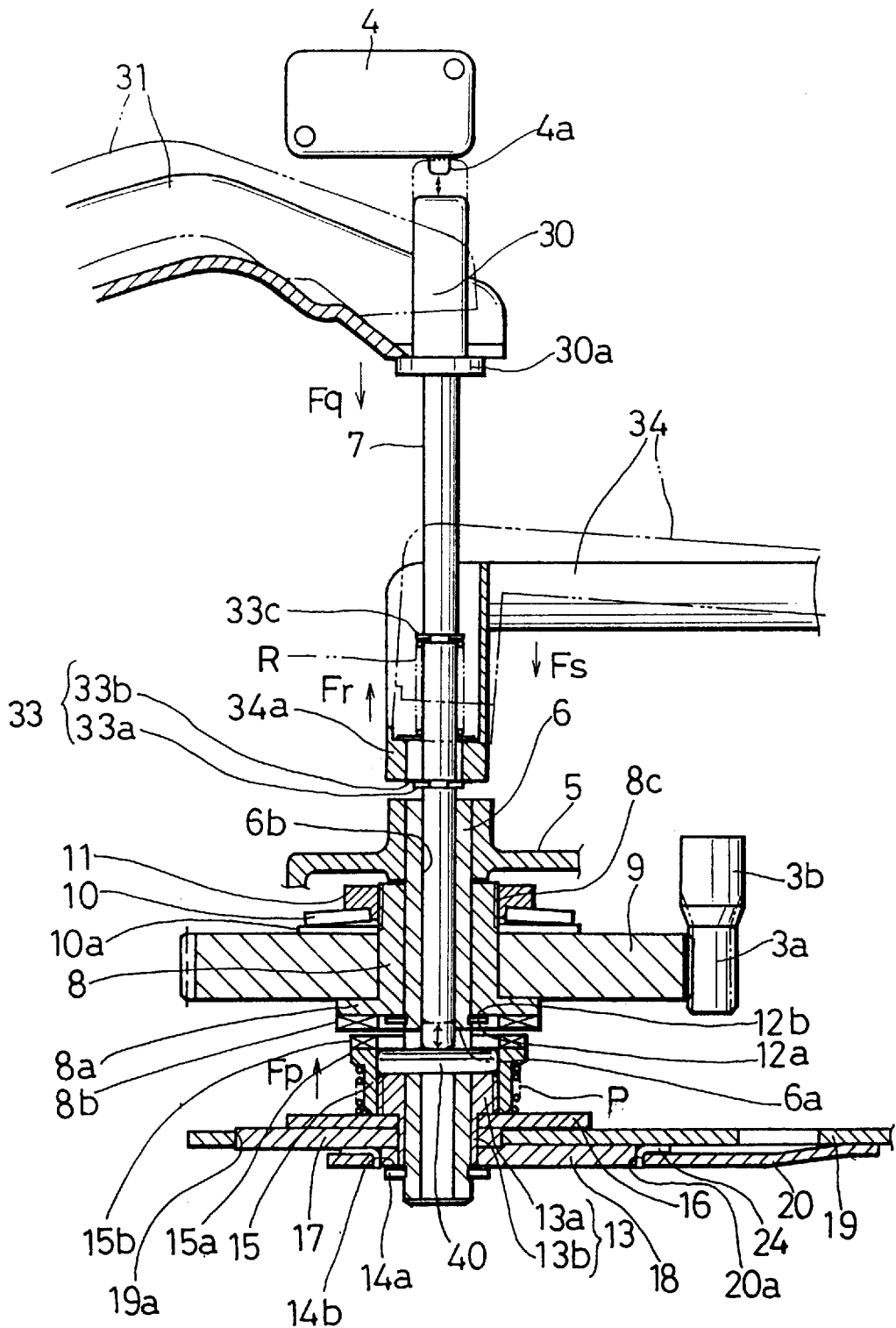
FIG. 2 is an enlarged view of the essential parts of the hedge trimmer shown in FIG. 1.

As shown in FIG. 2, a transmission sleeve 8 is rotatably fitted on the support sleeve 6. A drive gear 9 is rotatably mounted on the transmission sleeve 8 and is in engagement with the pinion gear 3a of the motor 3, so that the driver gear 9 is rotated when the motor 3 is started. A stopper ring 12a and a flat washer 12b are fitted on the support sleeve 6 so as to prevent the transmission sleeve 8 from moving downwardly from a predetermined position shown in FIG. 2.

Figure 3:
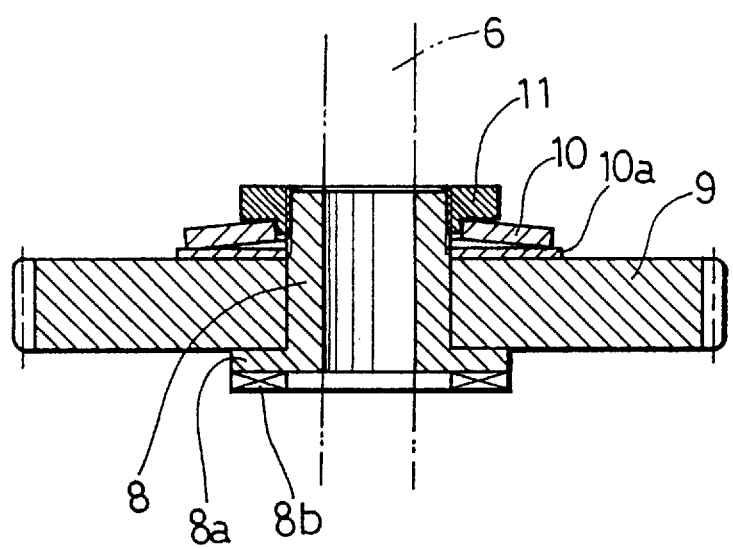
FIG. 3 is a sectional view showing a slip clutch of the hedge trimmer.

As shown in FIG. 3, a flange 8a is formed integrally with the lower end of the transmission sleeve 8 for supporting the lower surface of the drive gear 9. Clutch teeth 8b are formed on the lower surface of the flange 8a. A belleville spring 10 and an adjustor ring 11 is fitted on the upper end of the transmission sleeve 8. The adjustor ring 11 is threadably engaged with a threaded portion 8c formed on the upper end of the transmission sleeve 8. When the adjustor ring 11 is tightened downwardly with respect to the transmission sleeve 8, the belleville spring 10 is pressed on the upper surface of the drive gear 9 via a washer 10a. Then, a biasing force is applied by the belleville spring 10 to press the drive gear 9 on the flange 8a of the transmission sleeve 8, so that the transmission sleeve 8 is rotated together with the drive gear 9. The pressing force applied to the drive gear 9 can be selectively adjusted by varying the driving amount of the adjustor ring 11 with respect to the transmission sleeve 8. Thus, the belleville spring 10 and the adjustor ring 11 forms a torque limit mechanism or slip clutch between the transmission sleeve 8 and the drive gear 9. The slip clutch serves to cause slippage between the upper surface of the drive gear 9 and the washer 10a and between the lower surface of the drive gear 9 and the flange 8a when a torque exceeding the pressing force of the belleville spring 10 is loaded on the transmission sleeve 8 from cutter blades 19 and 20 which will be explained later. No excessive load is therefore applied to the motor 3.

An intermediate sleeve 13 is rotatably fitted on the support sleeve 6 at a position below the transmission sleeve 8 and adjacent the lower end of the support sleeve 6. A stopper ring 14a and a flat washer 14b is fitted on the lower end of the support sleeve 6 so as to prevent the intermediate sleeve 13 from moving downwardly from a position shown in FIG. 2. The intermediate sleeve 13 has an upper large-diameter part 13a and a lower small-diameter part 13b, so that the intermediate sleeve 13 has a two-stepped outer diameter. A clutch sleeve 15 is in engagement with the upper large-diameter part 13a by means of spline teeth (not shown), so that the clutch sleeve 15 is rotatable with the intermediate sleeve 13 but is slidably movable relative thereto in the axial direction. The intermediate sleeve 13 is prevented from movement in the axial direction.

A flange 15a is formed integrally with an upper end of the clutch sleeve 15. Clutch teeth 15b are formed on an upper surface of the flange 15a and are engageable with the clutch teeth 8b of the transmission sleeve 8. A flange member 16 is fixedly mounted on an upper portion of the small-diameter part 13b of the intermediate sleeve 13. A compression coil spring P is interposed between the flange member 16 and the flange 15a of the clutch sleeve 15, so that the clutch sleeve 15 is normally biased by the spring P upwardly toward the transmission sleeve 8 for engagement of the clutch teeth 15b with the clutch teeth 8b.

Figure 4B:
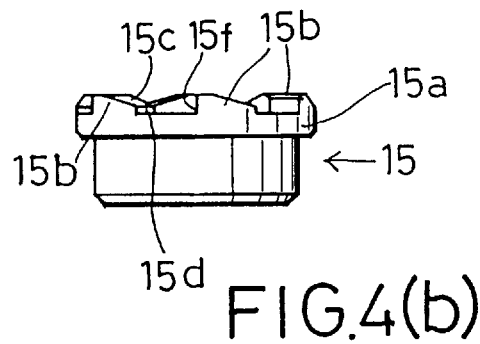
FIG. 4(b) is a front view of FIG. 4(a)
Figure 5A:
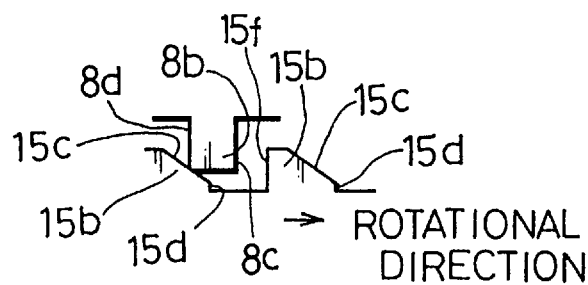
FIG. 5(a) is a schematic view showing clutch teeth of the clutch sleeve and clutch teeth of a transmission sleeve.

The configuration of each clutch tooth 15b of the clutch sleeve 15 will now be explained. As shown in FIGS. 4(b) and 5(a), each clutch tooth 15b has a substantially triangular configuration and includes a short vertical surface 15d and a slant surface 15c on one side in the rotational direction of the clutch sleeve 15. A vertical surface 15f is formed on the other side of each clutch tooth 15b. The slant surface 15c extends obliquely outward from an outer end of the short vertical surface 15d. On the other hand, each clutch tooth 8b of the transmission sleeve 8 has a rectangular configuration and includes vertical surfaces 8c and 8d each corresponding to the vertical surface 15f of the clutch tooth 15b, and transmission of torque between the clutch teeth 8b and the clutch teeth 15b is effected through abutment of the vertical surfaces 8c of each clutch tooth 8b on the vertical surface 15f of the corresponding clutch tooth 15b. With the aid of the slant surface 15c of the clutch tooth 15b, the clutch tooth 8b is brought to smoothly engage the next clutch tooth 15b.

The short vertical surface 15d is provided to cope with a particular situation which may be associated with this kind of hedge trimmer. Thus, as will be explained later, the cutting blades 19 and 20 are reciprocally moved with their moving speed periodically varied to increase and decrease. Therefore, although the transmission sleeve 8 is rotated at a constant speed, the cutting blades 19 and 20 periodically apply an inertia force to the clutch sleeve 15 to rotate the clutch sleeve 15 faster than the transmission sleeve 8. When this occurs, the clutch tooth 8b tends to disengage the clutch tooth 15b with the aid of the slant surface 15c of its adjacent clutch tooth 15b positioned in the reverse direction. However, with this embodiment, when the clutch tooth 8b is in engagement with the corresponding clutch tooth 15b, the vertical surface 8d of the clutch tooth 8b is in abutment on the short vertical surface 15d of the clutch tooth 15b. Therefore, once the clutch tooth 8b engages the corresponding clutch tooth 15b, the clutch tooth 8b may not be disengaged from the clutch tooth 15b even if the inertia force has been applied to the clutch sleeve 15 to rotate the clutch sleeve 15 faster than the transmission sleeve 8. Consequently, with this embodiment, a smooth engagement between the clutch tooth 8b and the corresponding clutch tooth 15b can be obtained with the aid of the slant surface 15c, while such an engagement is reliably maintained by the provision of the short vertical surface 15d.

Figure 5B:
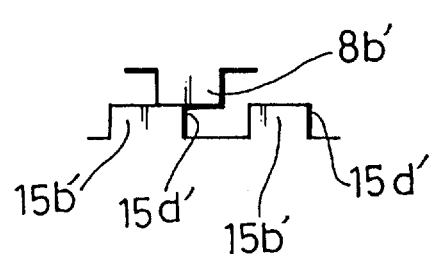
FIG. 5(b) is a schematic view corresponding to FIG. 5(a) but showing different tooth configurations.

In contrast, if each clutch tooth 15b' has a rectangular configuration having vertical surfaces 15d' on both sides as shown in FIG. 5(b), the clutch tooth 15b' may not be disengaged from a corresponding clutch tooth 8b' irrespective of the inertia force as described above. However, in this case, the clutch tooth 8b' cannot smoothly engage the clutch tooth 15b' but is liable to cause idle rotation.

Figures 4A, 4C:
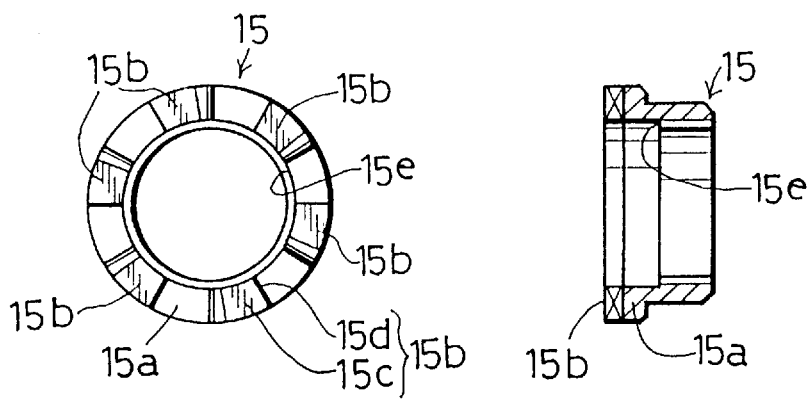
FIG. 4(a) is a plan view of a clutch sleeve of the hedge trimmer.
FIG. 4(c) is a sectional view of the clutch sleeve.

As shown in FIG. 4(c), a stepped portion 15e is formed on an inner wall of the clutch sleeve 15. A stopper pin 40 is rested on the stepped portion 15e and extends in a diametrical direction of the clutch sleeve 15 as shown in FIG. 2. The stopper pin 40 has both ends inserted into elongated slots 6a which are formed in the support sleeve 6 in the longitudinal direction of the support sleeve 6 and are positioned diametrically opposed to each other. Thus, the stopper pin 40 is movable vertically along the elongated slots 6a as the clutch sleeve 15 is vertically moved between a lower stroke end when the clutch teeth 15b are disengaged from the clutch teeth 8b as shown in FIG. 2 and an upper stroke end where the clutch teeth 15b are brought to engage the clutch teeth 8b. The control pin 7 inserted into the support sleeve 6 has a lower end normally abutting on the central portion of the stopper pin 40 by a biasing force in a downward direction which is larger than the biasing force of the spring P and which will be explained later, so that the clutch sleeve 15 is normally held at the lower stroke end. When the biasing force applied to the control pin 7 is released or weakened, the clutch sleeve 15 as well as the stopper pin 40 is moved upwardly by the biasing force of the spring P, resulting in that the control pin 7 is moved upwardly, so that the clutch sleeve 15 reaches the upper stroke end. Thus, the engagement and disengagement between the clutch teeth 15b and the clutch teeth 8b is controlled by the biasing forces applied to the control pin 7.

As shown in FIG. 2, an upper eccentric flange 17 and a lower eccentric flange 18 as well as the flange 16 is fixedly mounted on the small-diameter part 13b of the intermediate sleeve 13. The upper and lower eccentric flanges 17 and 18 have centers which are displaced from the center of the small-diameter part 13b and which are positioned oppositely to each other with respect to the center of the small-diameter part 13b. The upper eccentric flange 17 contacts the lower surface of the flange 16, and the lower eccentric flange 18 contacts the lower surface of the upper eccentric flange 17. The upper eccentric flange 17 and the lower eccentric flange 18 are inserted into elliptical slots 19a and 20a formed in rear ends of the cutting blades 19 and 20, respectively. Each of the elliptical slots 19a and 20a has a longitudinal axis in a widthswise direction of the corresponding cutting blade 19 or 20. With this construction, when the intermediate sleeve 13 is rotated through the clutch sleeve 15, the eccentric flanges 17 and 18 rotate around the axis of the intermediate sleeve 13 or the axis of the support sleeve 6, so that the cutting blades 19 and 20 are reciprocally moved in their longitudinal directions (right and left directions in FIG. 1 or 2). Here, the direction of movement of the cutting blade 19 is opposite to the direction of movement of the cutting blade 20, so that a cutting operation can be performed. As shown in FIG. 2, a spacer ring 24 is interposed between the lower eccentric flange 18 and the periphery of the elliptical slot 20a of the cutting blade 20 so as to prevent the eccentric flange 18 (or 17) from interference with a blade portion (not shown) of the cutting blade 20 (or 19) mounted on the other eccentric flange 18 (or 17).

As shown in FIG. 1, an upper stay 21 is mounted on the main body 2b and extends outwardly along the upper surface of the upper cutting blade 19. A lower stay 22 is mounted on the upper stay 21 by means of a bolt 37 and a distance ring 38. The lower stay 22 extends outwardly along the lower surface of the lower cutting blade 20. The distance ring 38 provides an appropriate space between the upper stay 21 and the lower stay 22, so that the cutting blades 19 and 20 can be smoothly reciprocally moved in their longitudinal directions within the space with their blade portions being extended outwardly from the space.

An under cover 23 is mounted on the lower opening of the gear housing 5 for preventing any dust from entering the gear housing 5. Thus, the gear mechanism disposed within the gear housing 5 is prevented from improper operation. A safety guard 39 is mounted on the front portion of the main body 2b so as to cover the upper side of the cutting blades 19 and 20. The safety guard 39 serves to prevent any chips of trimmed trees from scattering toward an operator.

The control pin 7 extends upwardly from the upper end of the support sleeve 6, so that an upper end of the control pin 7 reaches a position adjacent and below the button 4a of the switch 4. A cap 30 is mounted on the upper end of the control pin 7. The cap 30 has a flange 30a formed on its lower end. The length of the control pin 7 including the cap 30 is determined such that the button 4a is pushed by the control pin 7 for turning on the switch 4 when the control pin 7 is moved upwardly from a position shown by solid lines in FIG. 2 to reach a switch-on position shown by chain lines. When the control pin 7 is positioned at the switch-on position, the clutch sleeve 15 is at the upper stroke end where the clutch teeth 15b of the clutch sleeve 15 are in sufficient engagement with the clutch teeth 8b of the transmission sleeve 8. It is to be noted that, at the switch-on position, a space is formed between the lower end of the control pin 7 and the stopper pin 40. In other words, as the control pin 7 is moved downwardly from the switch-on position, the switch 4 is turned off and thereafter the clutch teeth 15b are disengaged from the clutch teeth 8b.

As shown in FIG. 1, a first switch lever 31 has one end pivotally mounted on an inner peripheral edge of the handle 2a of the housing 2 by means of a support pin 32. The other end of the first switch lever 31 is in abutment on the upper surface of the flange 30a of the cap 30. A compression coil spring Q is interposed between the first switch lever 31 and the handle 2a so as to bias the first switch lever 31 in a clockwise direction in FIG. 1 about the support pin 32, so that the control pin 7 is normally biased in a downward direction by the spring Q via the first switch lever 31. When the operator grasp the handle 2a together with the first switch lever 31, the first switch lever 31 is pivoted in a counterclockwise direction to a position shown by chain lines in FIG. 2, so that the other end of the first switch lever 31 is moved upwardly and that no biasing force of the spring Q is applied to the control pin 7.

A stopper member 33 including a stopper ring 33a and a flat washer 33b is mounted on the control pin 7 at a middle position of the control pin 7 in the longitudinal direction. The stopper ring 33a is fixed to the control pin 7, and the washer 33b is placed on the stopper ring 33a. An intermediate arm 34 has one end having a flange 34a which is normally in abutment on the flat washer 33b of the stopper member 33. A stopper ring 33c is fixed to the control pin 7 at a position spaced upwardly from the stopper ring 33a by a suitable distance. A coil spring R is interposed between the stopper ring 33c and the upper surface of the flange 34a of the intermediate arm 34. The spring R serves to provide a biasing force to move the control pin 7 upwardly. The coil spring R may be previously compressed to normally provide a biasing force or may provide a biasing force only when the second switch lever 35 is pivoted by the operator to move the flange 34a of the intermediate arm 34 upwardly.

As shown in FIG. 1, a support pin 34b is mounted on the other end of the intermediate arm 34 and is rotatably supported by the main body 2, so that the intermediate arm 34 is pivotable about an axis of the support pin 34b to vary the vertical position of the flange 34a. A square recess 34c is formed on an end surface of the support pin 34b and receives a corresponding protrusion (not shown) formed on a lower end of the second switch lever 35, so that the second switch lever 35 is inclined relative to the intermediate arm 34 and is fixed in position relative thereto. Thus, the second switch lever 35 pivots rightward and leftward directions in FIG. 1 together with the intermediate arm 34, A grip 36 is fixed to the front portion of the main body 2a and extends upwardly and obliquely (in the rightward direction in FIG. 1) from the main body 2a. A compression spring S is interposed between the grip 36 and the second switch lever 35, so that the second switch lever 35 is normally biased in the leftward pivoted direction. Thus, the intermediate arm 34 is biased to press the control pin 7 downwardly through the flange 34a and the stopper member 33 for moving the clutch sleeve 15 downwardly toward the lower stroke end where the clutch teeth 15a are in disengagement from the clutch teeth 8a. When the operator grasp the grip 36 together with the second switch lever 35 to pivot the second switch lever 35 rightwardly in FIG. 1, the flange 34a is moved upwardly, so that no biasing force of the spring S is applied to the control pin 7.

Here, the biasing forces applied to the control pin 7 by the springs P, Q, R and S are determined as follows:

Fq>Fp+Fr

Fs>Fp

Fp: biasing force of the spring P

Fq: biasing force of the spring Q

Fr: biasing force of the spring R produced when the second switch lever 35 is pivoted to release the biasing force Fs Fs: biasing force of the spring S Thus, in the state indicated by solid lines in FIG. 2, the biasing force Fp of the spring P is applied in a direction to move the control pin 7 upwardly. On the other hand, the biasing force Fq of the spring Q as well as the biasing force Fs of the spring S are applied in a direction to press the pin 7 downwardly. The biasing force Fq as well as the biasing force Fs is greater than the biasing force Fp. Therefore, the clutch sleeve 15 is held at the lower stroke end where the clutch teeth 15b are disengaged from the clutch teeth 8b. Thus, in this state, the lower end of the control pin 7 abuts on the stopper pin 40 and applies the downward biasing force to the clutch sleeve 15.

With this construction, the control pin 7 is moved upwardly by the biasing forces Fp only when both the first and second switch levers 31 and 35 are pivoted by the operator to release their biasing forces Fq and Fs. When only the first switch lever 31 is pivoted by the operator to release the biasing force Fq, the biasing force Fs is still applied to the control pin 7, so that the clutch sleeve 15 is held at the lower stroke end. Further, when only the second switch lever 35 is pivoted to release the biasing force Fs, the spring S is compressed to produce the biasing force Fr, and therefore, the sum of the biasing forces Fr and Fp are applied to the control pin 7 in the upward direction. However, the biasing force Fq is determined to be greater than the sum of the biasing forces Fr and Fp, so that the clutch sleeve 15 is also held at the lower stroke end.

When the operator grasps the handle 2a and the grip 36 with both hands to pivot both the first and second switch levers 31 and 35 so as to release their biasing forces Fq and Fs, the control pin 7 is moved upwardly by the biasing force Fr of the spring R and by the biasing force Fp applied to the pin 7 via the clutch sleeve 15 and the stopper pin 40, so that the clutch sleeve 15 is moved upwardly to the upper stroke end where the clutch teeth 15b are brought in engagement with the clutch teeth 8b and where the clutch sleeve 15 is prevented from moving further upwardly. After the clutch teeth 15b and 8b are thus engaged, the control pin 7 is moved further upwardly away from the stopper pin 40 by the biasing force Fr of the spring R, so that the control pin 7 reaches the switch-on position where the button 4a is pushed into the switch 4 to start the motor 3. Then, the rotation of the motor shaft 3b is transmitted to the transmission sleeve 8 via the drive gear 9 and further to the clutch sleeve 15, so that the eccentric flanges 17 and 18 are rotated about the axis of the intermediate sleeve 8 or the axis of the support sleeve 6 to drive the cutting blades 19 and 20 for a cutting operation.

When the operator releases the first and second switch levers 31 and 35, the control pin 7 is moved downwardly to stop the motor 3 and is further moved downwardly to abut on the stopper pin 40 so as to press the clutch sleeve 15 downwardly through the stopper pin 40 against the biasing force Fp of the spring P. Then, the clutch teeth 15a and 8a are disengaged from each other. Thus, with this embodiment, the clutch teeth 15a and 8b are disengaged after the motor 3 has been stopped. This may permit smooth disengagement of the clutch and is particularly advantageous when the cutting blades 19 and 20 are locked to stop their movement during the trimming operation. More specifically, when the cutting blades 19 and 20 are locked, the drive gear 9 rotates idly relative to the transmission sleeve 8 due to the slip clutch between the drive gear 9 and the transmission sleeve 8. However, a substantial rotational torque is still applied to the transmission sleeve 8 and therefore, the clutch teeth 8a are in engagement with the clutch teeth 15a by a greater force. For this reason, even if the biasing forces Fq and Fs of the springs Q and S have been applied to the clutch sleeve 15 at this stage, the clutch sleeve 15 may not be moved downwardly or the clutch teeth 15a may not be disengaged from the clutch teeth 8a in some cases. With this embodiment, the biasing forces Fq and Fs are applied after the motor 3 has been stopped, and therefore, the clutch sleeve 15 can be smoothly moved to disengage the clutch teeth 15b from the clutch teeth 8b.

As described above, with this embodiment, both the control for engagement between the clutch teeth 15b and 8b, and the control for starting and stopping the motor 3 is performed through vertical movement of the control pin 7 which is a single member.

Additionally, the clutch teeth 15b and 8b may not engage each other and the motor 3 may not start unless both the switch levers 31 and 35 are operated by the operator.

The movement of the control pin 7 for operation of the clutch member 15 and the motor 3 is controlled by four biasing springs P, Q, R and S and the first and second switch levers 31 and 35, so that a link mechanism connected to each switch lever as required in the prior art can be omitted. Thus, the number of parts is reduced and the construction of the hedge trimmer 1 is simple compared with the prior art. Additionally, the clutch member 15 as well as the switch 4 can be reliably operated.

Further, the drive gear 9, the transmission sleeve 8, the clutch sleeve 15 and the button 4a of the switch 4 are positioned on the same axis as the control pin 7, so that no large space is required for these parts and that the hedge trimmer 1 is small in size.

While the invention has been described with reference to a preferred embodiment thereof, it is to be understood that modifications or variation may be easily made without departing from the spirit of this invention which is defined by the appended claims.

What is claimed is:

1. A hedge trimmer comprising:

a motor;

cutting means driven by said motor;

clutch means interposed between said motor and said cutting means;

a first and a second handle for grasping with both hands of an operator;

switch means electrically connected to said motor for starting and stopping said motor; and clutch control means for connecting and disconnecting said clutch means;

said clutch control means including:

a first and a second switch lever associated with said first and second handles, respectively, and operable by the operator between a first and a second position, respectively;

a pin operably connected to said first and second switch levers and movable between a connecting position for connecting said clutch means and a disconnecting position for disconnecting said clutch means;

biasing means for holding said pin at said disconnecting position when at least one of said first and second switch levers are at said first position, said biasing means permitting movement of said pin from said disconnecting position to said connecting position when both said first and second switch levers are moved from said first position to said second position;

said pin having a first end for operating the switch means and a second end for operating the clutch means;

said pin being movable in an axial direction between said disconnecting position and said connecting position, and said clutch means and said switch means being coaxially disposed on an axis of said pin.

2. The hedge trimmer as defined in claim 1 wherein said pin (7) includes a first portion (30*a*) for abutment to said first switch lever (31) and includes a second portion (33) for abutment to said second switch lever (34), said first and second portions being positioned between said first and second ends; and further includes a drive gear driven by said motor for rotation, the rotation of said drive gear being transmitted to said cutting means via said clutch means, and said drive gear having a rotational axis on the same axis as said pin.

3. The hedge trimmer as defined in claim 2 wherein:

said drive gear (9) is rotatably supported on a support sleeve (6) that is fixed in position relative to a gear housing (5);

said clutch means is disposed below and adjacent said drive gear (9) in an axial direction of said pin; and said support sleeve (6) has an axial bore (6*b*) formed therein for axially movably receiving said pin, so that said pin is movable to extend downwardly beyond said drive gear for operating said clutch means.

* * * * *